United States Patent
Park (10) Patent No.: US 9,103,316 B2
(45) Date of Patent: Aug. 11, 2015

(54) TIDAL CURRENT POWER GENERATOR

(75) Inventor: Jong-Seon Park, Seoul (KR)

(73) Assignee: RENETEC CO., LTD., Yeongam-Gun, Jeollanam-Do (KR)

( * ) Notice: Subject to any disclaimer, the term of this patent is extended or adjusted under 35 U.S.C. 154(b) by 56 days.

(21) Appl. No.: 13/981,827

(22) PCT Filed: Feb. 25, 2011

(86) PCT No.: PCT/KR2011/001372
§ 371 (c)(1),
(2), (4) Date: Oct. 9, 2013

(87) PCT Pub. No.: WO2012/102433
PCT Pub. Date: Aug. 2, 2012

(65) Prior Publication Data
US 2014/0035283 A1     Feb. 6, 2014

(30) Foreign Application Priority Data

Jan. 28, 2011  (KR) .......................... 10-2011-0009024

(51) Int. Cl.
*F03B 13/10*        (2006.01)
*F03B 13/12*        (2006.01)
(Continued)

(52) U.S. Cl.
CPC ........... *F03B 13/264* (2013.01); *F05B 2240/40* (2013.01); *F05B 2240/90* (2013.01); *F05B 2240/95* (2013.01); *F05B 2240/97* (2013.01); *Y02E 10/28* (2013.01); *Y02E 10/38* (2013.01)

(58) Field of Classification Search
CPC .................................................. F05B 2240/97
USPC ........ 290/42, 53, 1 R, 4 R; 416/9, 37, 39, 44, 416/61, 63, 90 R, 99, 116, 120, 177, 178, 416/179, 246
See application file for complete search history.

(56) References Cited

U.S. PATENT DOCUMENTS 4,159,188 A * 6/1979 Atencio .......................... 405/78
4,163,904 A * 8/1979 Skendrovic ..................... 290/54
(Continued)

FOREIGN PATENT DOCUMENTS

| JP | 58-104371 A | 6/1983 |
| KR | 10-0849673 B1 | 8/2008 |
| KR | 10-2010-0135010 A | 12/2010 |

OTHER PUBLICATIONS

International Search Report and the Written Opinion for International Application PCT/KR2011/001372, mailed Oct. 18, 2011.
(Continued)

*Primary Examiner* — Tulsidas C Patel
*Assistant Examiner* — Charles Reid, Jr.
(74) *Attorney, Agent, or Firm* — Fanelli Haag PLLC (57) ABSTRACT

The present invention relates to a tidal current power generator. In the tidal current power generator, tidal current flows in a concentrated manner into a power generation module for generating electrical energy using the flow of tidal current, in order to increase the speed of the tidal current. Thus, the amount of electrical energy generated by the power generation module may be improved to achieve highly efficient performance. Also, the range of locations in which the power generation module may be installed is significantly expanded in order to increase the electrical generation using tidal current. Since the power generation module is integrally assembled and then refloated in order to install same on the bottom of the sea, the power generation module may be easily installed as well as easily repaired and maintained.

12 Claims, 6 Drawing Sheets

(51) Int. Cl.
   *H02P 9/04*      (2006.01)
   *F03B 13/00*    (2006.01)
   *F03B 13/26*    (2006.01)

(56) References Cited

U.S. PATENT DOCUMENTS

| | | | | |
|---|---|---|---|---|
| 4,165,467 | A * | 8/1979 | Atencio | 290/52 |
| 4,279,539 | A * | 7/1981 | Gutierrez Atencio | 405/76 |
| 4,319,142 | A * | 3/1982 | Mayo, Jr. | 290/52 |
| 4,326,819 | A * | 4/1982 | Atencio | 405/78 |
| 4,345,159 | A * | 8/1982 | Gutierrez Atencio | 290/43 |
| 4,868,408 | A * | 9/1989 | Hesh | 290/52 |
| 5,009,568 | A * | 4/1991 | Bell | 415/3.1 |
| 5,440,176 | A | 8/1995 | Haining | 290/54 |
| 7,116,005 | B2 * | 10/2006 | Corcoran, III | 290/43 |
| 7,478,974 | B1 | 1/2009 | Kelly | 405/78 |
| 8,354,758 | B1 * | 1/2013 | Boschma | 290/54 |
| 2005/0099012 | A1 * | 5/2005 | Williams | 290/54 |
| 2006/0232075 | A1 * | 10/2006 | Fraenkel | 290/54 |
| 2008/0265583 | A1 * | 10/2008 | Thompson | 290/54 |
| 2008/0284176 | A1 * | 11/2008 | Fraenkel | 290/54 |
| 2009/0127859 | A1 * | 5/2009 | Jones et al. | 290/53 |
| 2009/0134623 | A1 * | 5/2009 | Krouse | 290/43 |
| 2009/0179425 | A1 * | 7/2009 | Van Drentham Susman et al. | 290/53 |
| 2010/0066089 | A1 * | 3/2010 | Best et al. | 290/52 |
| 2010/0102566 | A1 * | 4/2010 | West et al. | 290/54 |
| 2010/0135766 | A1 * | 6/2010 | Allaei | 415/1 |
| 2010/0150718 | A1 * | 6/2010 | Freda | 416/120 |
| 2010/0158705 | A1 * | 6/2010 | Guinard | 417/53 |
| 2010/0283248 | A1 * | 11/2010 | Moffat | 290/52 |
| 2010/0289268 | A1 * | 11/2010 | Schiller | 290/54 |
| 2011/0115228 | A1 * | 5/2011 | Stothers et al. | 290/52 |
| 2011/0148117 | A1 * | 6/2011 | Bailey | 290/52 |
| 2011/0187102 | A1 * | 8/2011 | Sirseth | 290/42 |
| 2011/0248504 | A1 * | 10/2011 | Yu | 290/53 |
| 2011/0316281 | A1 * | 12/2011 | Mulvey et al. | 290/53 |
| 2012/0013129 | A1 * | 1/2012 | Cornelius et al. | 290/54 |
| 2012/0124986 | A1 * | 5/2012 | Carter | 60/398 |

OTHER PUBLICATIONS

English abstract of KR 10-0849673 B1.
English abstract of KR 10-2010-0135010 A.
English abstract of corresponding publication of JP 58-104371 A.

* cited by examiner

(a) FLOOD TIDE     (b) EBB TIDE

TIDAL CURRENT POWER GENERATOR

This application is a National Stage of PCT/KR2011/001372, filed Feb. 25, 2011 which claims priority to Korean Application No. 10-2011-0009024, filed Jan. 28, 2011, the disclosures of which are incorporated herein by reference in their entirety.

TECHNICAL FIELD

The present invention relates to a tidal current power generator, and more specifically, to a tidal current power generator, which is configured in such a way that the speed of seawater is increased by making seawater flow in a concentrated manner into a power generation module that produces electrical energy using the flow of seawater, so that the amount of electrical energy generated by the power generation module is improved to achieve highly efficient performance, and the generation module is installed on the bottom of the sea after it is integrally assembled on the ground and refloated, so that it is easily installed, repaired and maintained.

BACKGROUND ART

Recently, the energy issue has become a serious problem not only domestically but also internationally. Especially fossil energy that is used most widely for power generation has a problem of energy depletion along with environmental pollution.

Thus, alternative energy is being developed all over the world, and nuclear energy can be mentioned as an example of alternative energy. But nuclear energy, which is currently a major alternative energy to fossil fuel, is controversial because of harmful effects due to nuclear waste disposal and radioactive effluents. Although there are power generation facilities using sunlight or wind power, they have a problem that it is difficult to get enough electric power depend upon circumstances. In addition, hydroelectric power generation requires high construction costs and a large area must be submerged to construct a dam, so it causes environmental destruction.

Taking these problems into account, tidal current power generators using kinetic energy of seawater are recently attracting attention. In general, tidal current power generation produces electricity by installing a generator in a place where the flow velocity of seawater is fast. It has advantages in that the movement of ships is unhindered depending on the installation method, and that it is an environmentally friendly alternative energy system which does not obstruct the movement of fish and does not affect the ecosystem around it, and that the amount of power generation can be estimated because the movement of seawater is regular.

Such tidal current power generators are installed mainly in an area where the seawater flow of flood tide or ebb tide is accelerated by topographical conditions because it should have a seawater flow of more than a certain speed in order to produce electricity by rotating turbines.

However, places where such a general tidal current power generator can be installed are limited and there is a limit to increasing the output by the flow velocity of given seawater, and there is a difficulty in securing economic viability by generation quantity, so its propagation has not yet widely expanded.

DISCLOSURE

Technical Problem

Accordingly, to solve the above-mentioned problems, it is an object of the present invention to provide a tidal current power generator, which is configured to increase she speed of seawater by making seawater flow in a concentrated manner into a power generation module that produces electrical energy using the flow of seawater, so that the amount of electrical energy generated by the power generation module is improved to achieve highly efficient performance.

Another object of the present invention is to provide a tidal current power generator, which can be easily installed, repaired and maintained by installing the generation module on the bottom of the sea after assembling the generation module integrally on the ground and sinking it.

Another object of the present invention is to provide a tidal current power generator, which is mounted in such a way that the position of the generation module disposed between support guide bodies can be moved up and down, so that necessary work can be done in an economic way without extra equipment or underwater work, and the generation module is moved to the optimum position according to the flow velocity distribution upward and downward with respect to the flow of seawater for higher generation efficiency performance.

Another object of the present invention is to provide a tidal current power generator, in which the flow of seawater flowing into the generation module according to a specific situation can be stopped, so that installation work, etc. of the generation module may be carried out under the same condition as on the ground to carry out necessary work regardless of seawater flow or maritime meteorological conditions.

Technical Solution

To achieve the above objects, the present invention provides a tidal current power generator for producing electrical energy by using a flow of seawater, including: a plurality of support guide bodies disposed on a bottom of the sea at intervals in a width direction; and generation modules which are coupled to the support guide bodies so as to be positioned between the support guide bodies, and have rotor blades rotated by the flow of seawater to produce electrical energy by the rotary force of the rotor blades, wherein the support guide bodies are formed in such a way that the speed of seawater is increased by guiding the flow of seawater in a concentrated manner toward the generation module.

In this case, the support guide bodies may be formed in a longitudinally long shape disposed in a flow direction of seawater, and may have sloping surfaces formed on both sides in such a way that a gap between mutually facing sides of the adjacent support guide bodies becomes gradually narrow toward the generation module in the flow direction of sea water, thereby increasing the speed of seawater.

In addition, the sloping surface may be formed in any type that the speed of seawater is higher at a position where the generation module is installed than the inlet side of the support guide body.

Further, the sloping surfaces may be formed with a sloping angle gradually decreasing from a central portion to opposite end portions of the support guide body in a lengthwise direction, and the generation module may be disposed in the central portion of the support guide body in the lengthwise direction, so as operate the generation module in a state that the flow direction of seawater has completely changed.

Meanwhile, a guide slot may be formed in the central portion of the support guide body in a vertical direction, and opposite end portions of the generation module may be slidably inserted in the guide slot in the vertical direction.

In this case, the generation module may include: a generator body having a generator housed therein and the rotor blades coupled to one end portion thereof; support rods extending from opposite sides of the generator body in a horizontal direction; and guide bars which are formed in an elongated shape in the vertical direction and connected to one end of the respective support rods to slidably inserted in the guide slot.

In this case, the support rod may be formed in a streamline shape with convexly curved portion in center to the lengthwise direction of a vertical section to decrease a resistance against the flow of seawater.

In addition, the tidal current power generator may further include a vertical driving unit configured to move the generation module in the vertical direction along the guide slot.

In this case, the vertical driving unit may include: a rack bar which is mounted on the guide bar and has a rack gear formed on one side thereof; a driving motor mounted on the support guide body with a rotating shaft; and a pinion gear fixed to one end of the rotating shaft of the driving motor to mesh with the rack gear of the rack bar.

In addition, the tidal current power generator may further include: a plurality of flow velocity sensors disposed in opposite end portions of the support guide body at intervals in the vertical direction to detect a flow velocity of seawater; and a controller which controls the vertical driving unit to adjust a vertical level of the generation module based on the vertical distribution of flow velocity of seawater detected by the plurality of flow velocity sensors.

Meanwhile, the tidal current power generator may further include shield plates inserted between opposite end portions of the support guide body to be disposed between adjacent support guide bodies.

In this case, the support guide body may be disposed in a type in which the support guide body is mounted on a separate base structure on the bottom of the sea. The Shield plates are suitably matched with the base structure in moving downwardly.

Meanwhile, n support guide bodies and n−1 generation modules disposed between n support guide bodies may form one generation assembly, and the generation assembly may be assembled on a ground before it is installed integrally on the bottom of the sea.

In this case, a plurality of generation assemblies may be disposed in the lengthwise direction of the support guide body at given intervals each other.

Advantageous Effects

According to the present invention, the amount of electrical energy generated by the generation module is improved to achieve highly efficient performance, by configuring in such a way that the speed of seawater is increased by flowing seawater in a concentrated manner into the generation module that produces electrical energy using the flow of seawater.

Further, it is easy to install, repair and maintain the power generator, as the generation module and the support guide body that support the same are installed on the bottom of the sea with the way of sinking after they are assembled integrally on the ground.

Further, it is possible to carry out necessary work in an economic way without extra equipment or underwater work during maintenance of the generation module by mounting the position of the generation module disposed between support guide bodies movably up and down, and higher generation efficiency performance can be achieved by moving the generation module to the optimum position according to the flow velocity distribution upward and downward with respect to the flow of seawater.

Further, economic installation and maintenance are possible because work necessary for installation and maintenance of the generation module can be done under the same conditions as on the ground regardless of the flow condition of seawater and maritime meteorological conditions, by making the flow of seawater flowing into the generation module be able to stop depending on specific situations.

Further, it is possible to achieve an adequate quantity of production of electricity, by installing a generation module in an area where electricity cannot be produced by the generation module in the existing seawater flow by installing support guide bodies that can increase seawater flow.

Further, in building a large-unit electricity generation complex where generation modules are installed one after another lengthwise of the support guide body, the support guide body has a structure causing the seawater flow to recover to a normal laminar flow condition more quickly, thereby making it possible to install more generation modules in the same area.

BEST MODE

Hereinafter, preferable embodiments of the present invention will be described with reference to the accompanying drawings. Referring to the drawings, wherein like reference characters designate like or corresponding parts throughout the several views. In the embodiments of the present invention, detailed description of the publicly known functions and configurations that are judged to be able to make the purport of the present invention unnecessarily obscure are omitted.

Figure 1:
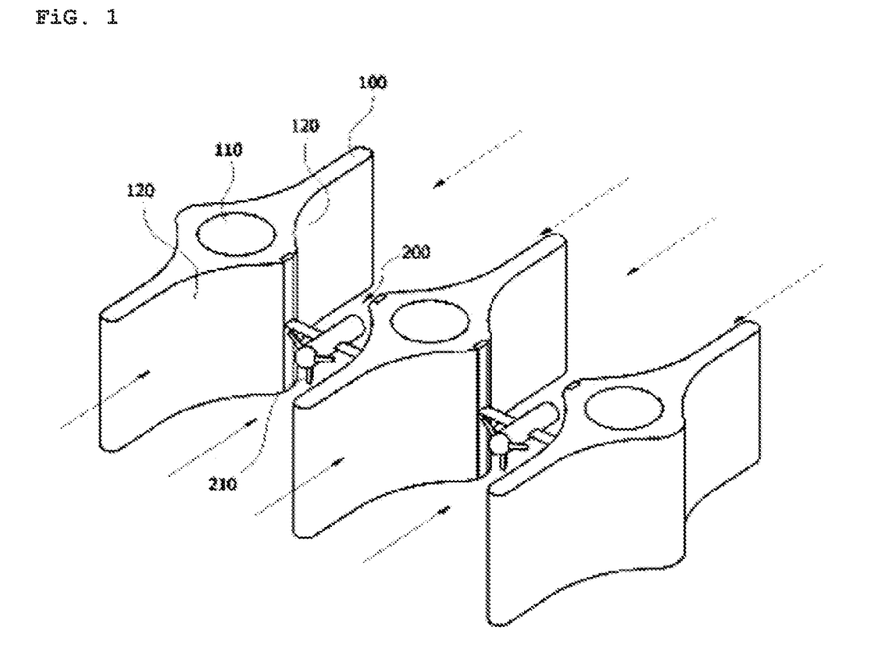
FIG. 1 is a perspective view schematically showing an exterior structure of a tidal current power generator according to one embodiment of the present invention.
Figure 2:
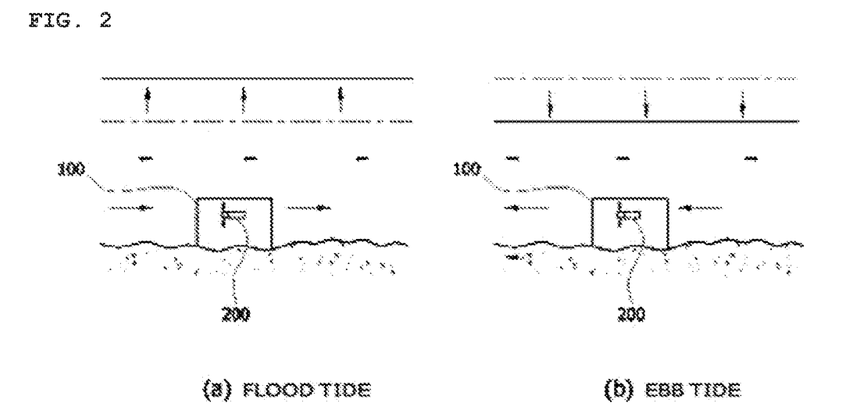
FIG. 2 is a side view conceptually showing an installed state of the tidal current power generator of one embodiment of the present invention.
Figure 3:
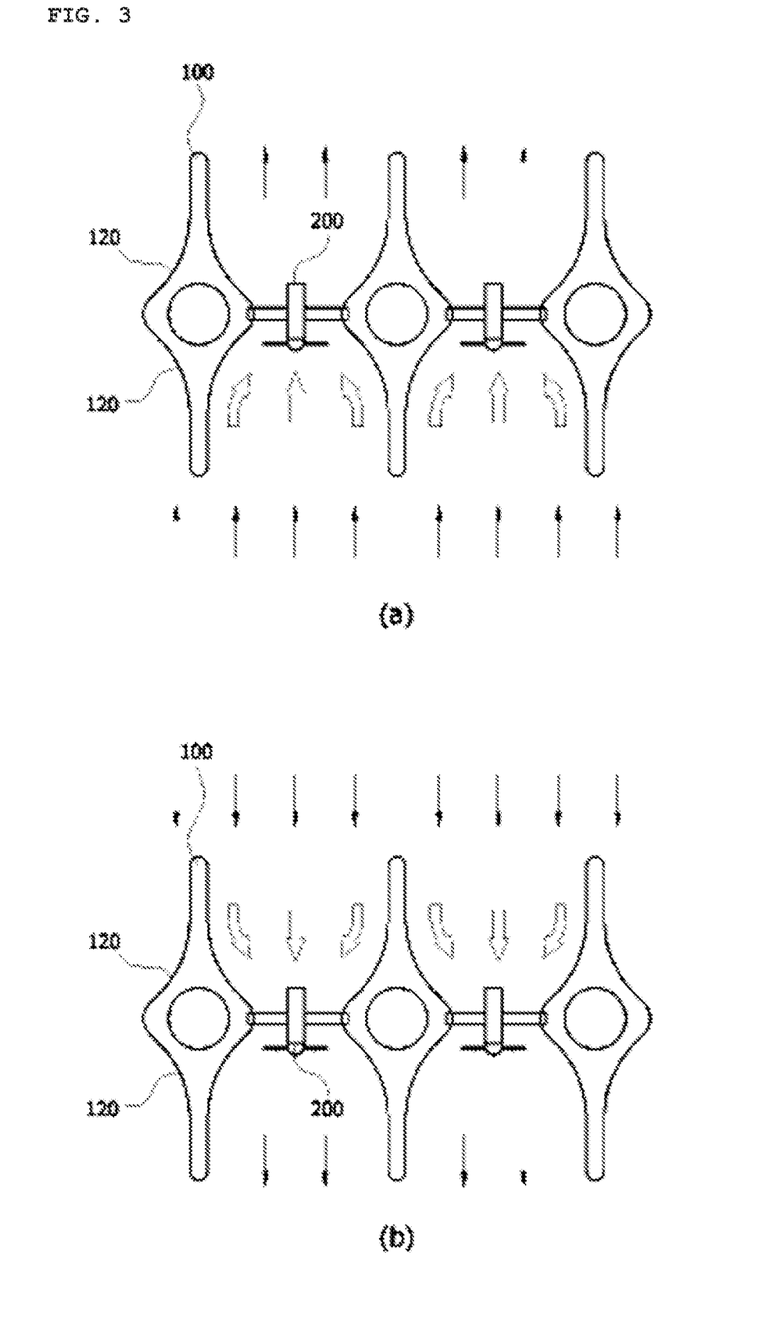
FIG. 3 is a plan view conceptually showing the flow state of seawater resulting from the tidal current power generator according to one embodiment of the present invention.

FIG. 1 is a perspective view schematically showing an exterior structure of a tidal current power generator according to one embodiment of the present invention, FIG. 2 is a side view conceptually showing an installed state of the tidal current power generator of one embodiment of the present invention, and FIG. 3 is a plan view conceptually showing the flow state of seawater resulting from the tidal current power generator according to one embodiment of the present invention.

The tidal current power generator according to one embodiment of the present invention is an apparatus producing electrical energy by using the flow of seawater resulting from the seawater flux of flood tides and ebb tides, and includes support guide bodies 100 configured to guide the flow of seawater and generation modules 200 which are coupled to the support guide bodies 100 to produce electrical energy according to the flow of seawater.

The support guide bodies 100 are disposed on the bottom of the sea with a large seawater flow. They may be disposed in a type resting on the seafloor or in a type separated from the seafloor via separate structures. When the support guide bodies 100 are disposed on the seafloor, the support guide bodies 100 may be disposed in a type in which the support guide bodies 100 are mounted on separate base structures (not shown) after they are installed on the seafloor.

A plurality of the support guide bodies 100 are disposed at given intervals each other, and the generation modules 200 are coupled between the support guide bodies 100. Therefore, in order to perform the function of supporting the generation modules 200, it is preferable that the support guide bodies 100 are mounted immovably and stably on the seafloor. Further, the support guide bodies 100 may be formed in a hollow type so that an accommodation space is formed therein, and various components such as a vertical driving unit (500 of FIG. 5) to be described later can be mounted inside the support guide body 100. Therefore, a separate body cover 110 may be mounted on the upper side of the support guide body 100 so as to open and close the inner space of the support guide body 100 as shown in FIG. 1.

The generation module 200 is coupled to the support guide body 100 so as to be disposed between the support guide bodies 100 disposed separately from each other, and has a rotor blade 210 and is configured so as to produce electrical energy through the rotary force of the rotor blade 210 by the flow of seawater. In this case, the generation module 200 includes the rotor blade 210 rotated by the flow of seawater and a generator body 220 in which is disposed a generator (not shown) that receives the rotary force from the rotor blade 210 to produce electrical energy, and a detailed description of this will be given later.

Therefore, the tidal current power generator according to one embodiment of the present invention is configured in such a way that the rotor blade 210 of the generation module 200 is rotated by the flow of seawater flowing into the support guide bodies 100 and electrical energy is produced through she rotary force of the rotor blade 210.

In this case, the support guide body 100 according to one embodiment of the present invention is formed in such a way that the flow of seawater is guided into the generation module 200 in a concentrated manner. The flow of seawater is guided in concentration to the generation module 200 according to the shape of the support guide body 100 and the flow velocity increases, so the rotation velocity and rotary force of the rotor blade 210 of the generation module 200 increase to improve electrical energy production efficiency.

In a more detailed examination, the support guide body 100 is formed lengthways in one direction and is disposed lengthways in the flow direction of seawater, and sloping surfaces 120 are formed on both sides in the width direction in such a way that the gap between mutually facing sides of adjacent support guide bodies 100 becomes gradually narrow as they come close to the generation module 200 in the flow direction of seawater. At this time, it is preferable that the sloping surface 120 is formed so as to make a curved surface as shown in FIG. 1 and FIG. 3. The flow of seawater flowing into the space between the support guide bodies 100 that are adjacent to each other according to such a structure is guided along the sloping surfaces 120 of curved surface shape and the flow velocity increases gradually.

In addition, the sloping surfaces 120 are formed with a sloping angle gradually decreasing from a central portion to opposite end portions of the support guide bodies 100 in a lengthwise direction. At this time, it is preferable that the generation modules 200 are disposed at the central portion of the support guide bodies 100 in the lengthwise direction. Thus, the tidal current power generator according to one embodiment of the present invention is of such structure that it is possible to guide in concentration not only the flow of seawater by a flood tide but also the flow of seawater by an ebb tide into the generation modules 200.

That is, as shown in (a) of FIG. 3, when the flow of seawater generated at the time at flood tide is introduced between the adjacent support guide bodies 100, the flux cross sectional area of sea water decreases toward the generation modules 200 by the sloping surfaces 120 formed on one side between the central portion and the one end portion of the support guide body 100, thus the flow velocity of seawater increases along the sloping surface 120. Since the rotation velocity of the rotor blade 210 increases as the flow velocity of seawater increases, the amount of electrical energy produced by the generator increases in proportion to the cube of the seawater flow velocity increment. Likewise, as shown in (b) of FIG. 3, also in the flow of seawater generated at the time of an ebb tide, since the flux cross sectional area of sea water decreases toward the generation module 200 by the sloping surfaces 120 formed on the other side between the central portion and the other end portion the support guide body 100, the flow velocity of seawater increases likewise, thus the rotation velocity of the rotor blade 210 and the amount of electrical energy produced by the generator increase.

Thus, since the tidal current power generator according to one embodiment of the present invention can guide the flow of seawater in a concentrated manner into the generation modules 200 according to such a structure of the support guide body 100, it is a structure whereby electrical energy production efficiency is improved.

Next, the detailed configuration of the tidal current power generator according to one embodiment of the present invention will be described in detail.

Figure 4:
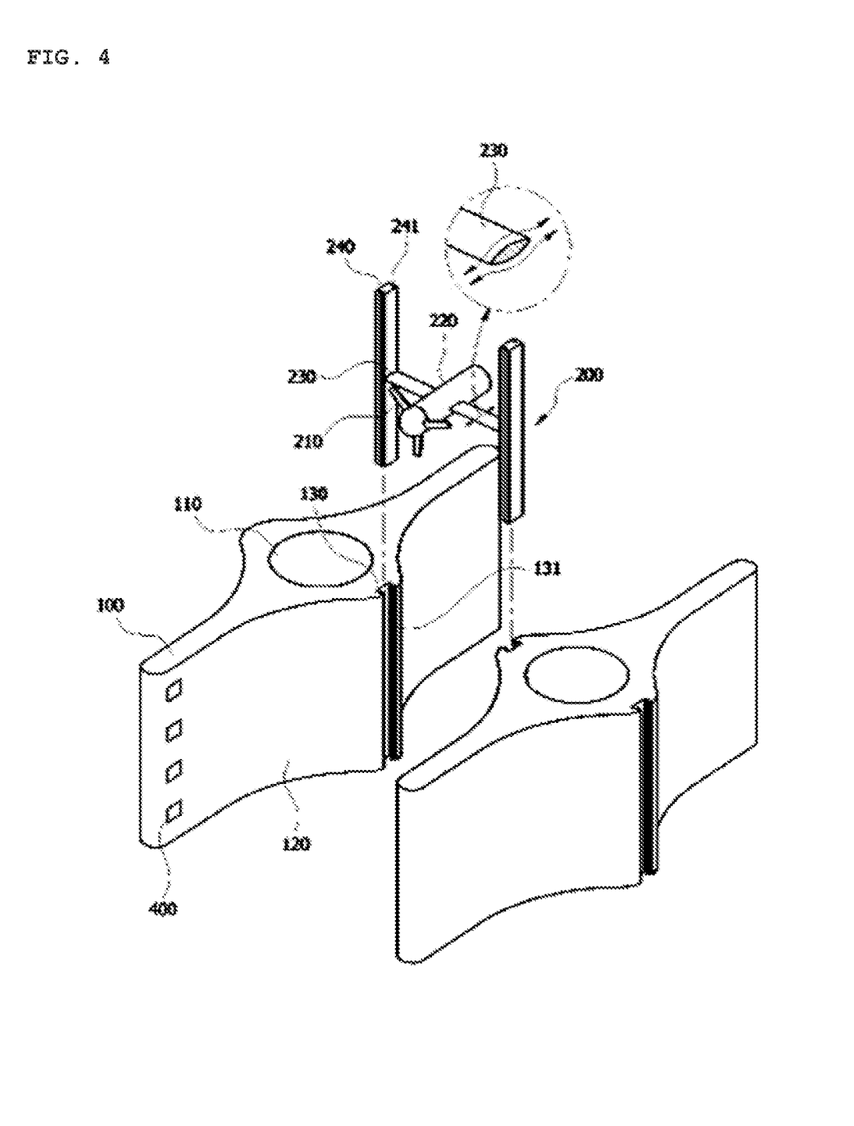
FIG. 4 is an exploded perspective view schematically showing a coupling structure of a support guide body and a generation module of the tidal current power generator according to one embodiment of the present invention.
Figure 5:
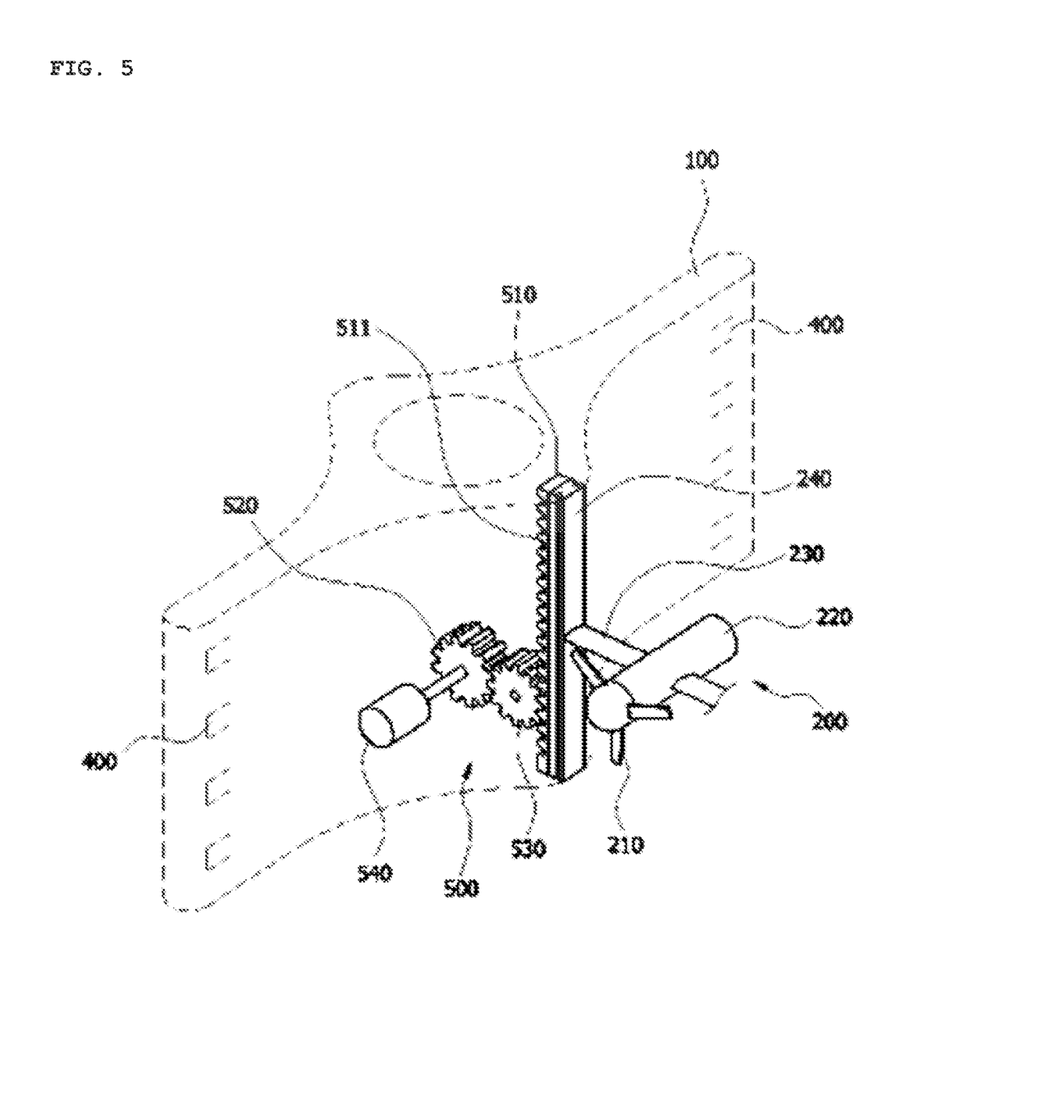
FIG. 5 is a perspective view schematically showing a configuration of a vertical driving unit of the tidal current power generator according to one embodiment of the present invention.
Figure 6:
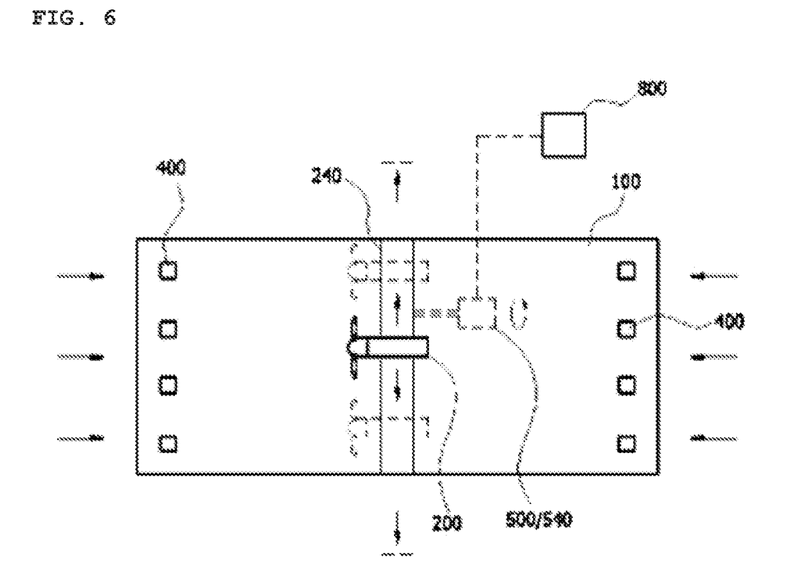
FIG. 6 is a side view schematically showing vertical moving states for the generation module of the tidal current power generator according to one embodiment of the present invention.

FIG. 4 is an exploded perspective view schematically showing a coupling structure of the support guide body and the generation module of the tidal current power generator according to one embodiment of the present invention, FIG. 5 is a perspective view schematically showing a configuration of the vertical driving unit of the tidal current power generator according to one embodiment of the present invention, and FIG. 6 is a side view schematically showing vertical moving states for the generation module of the tidal current power generator according to one embodiment of the present invention.

The tidal current power generator according to one embodiment of the present invention includes a guide slot 130 formed in the central portion of the support guide body 100 in a vertical direction as shown in FIG. 4, and the generation module 200 can be configured so as to be slidably inserted in the guide slot 130 in the vertical direction. At this time, guide rails 131 are formed lengthwise on inner opposite surfaces in the guide slot 130 so as to provide insertion guide paths to the generation module 200 inside of the guide slot 130, and rail slots 241 may be formed on the opposite sides of the generation module 200 so as to be inserted into and engaged with the guide rails 131.

The generation module 200 that is slidably inserted and coupled to the support guide body 100 as described above may include, as shown in FIG. 4, a generator body 220 having rotor blades 210 coupled to one end portion thereof and a generator (not shown) housed therein so as to produce electrical energy by the rotary force transmitted from the rotor blades 210, support rods 230 extending from opposite sides of the generator body 220 in a horizontal direction, and guide bars 240 which are formed in an elongated shape in the vertical direction and connected to one end of the respective support rods 230. The guide bars 240 are slidably inserted in the guide slots 130 of the support guide body 100. At this time, the rail slots 241 that are inserted into and meshed with the guide rails 131 are formed on the opposite sides of the guide bar 240.

According to such a configuration, the generation module 200 is disposed in the space between the support guide bodies 100, and is coupled to the support guide body 100 in a manner in which the guide bar 240 is slidably inserted in the guide slot 130 in one integrally assembled state. At this time, the generator body 220 with the rotor blades 210 coupled thereto is supported through the support rods 230 from the guide bar 240 and comes to be positioned in the central portion of the space between the support guide bodies 100. Accordingly, since the support rods 230 support the generator body 220 and are disposed in a manner traversing the space between the support guide bodies 100, the flow of seawater flowing through the space between the support guide bodies 100 is resisted by the support rods 230. Therefore, it is preferable that the support rods 230 according to one embodiment of the present invention be formed in a streamline shape so that the resistance of seawater flow can be minimized.

In this case, because the tidal current power generator according to one embodiment of the present invention is configured so as to generate power by using all of the bidirectional flows of seawater resulting from flood tides and ebb tides, it is preferable that the support rods 230 be formed in a streamline shape with convexly curved portion in center to the lengthwise direction of a vertical section as shown in FIG. 4 so as to minimize all the resistance against such bidirectional seawater flow.

Meanwhile, the generation module 200 that is slidably inserted to the support guide body 100 as described above can be coupled in such a way that it can move in the vertical direction along the guide slot 130 of the support guide body 100, and for this, a vertical driving unit 500 that drives the generation module 200 in the vertical direction may be provided further.

The vertical driving unit 500 is mounted on the guide bar 240 of the generation module 200 as shown in FIG. 5, and includes a rack bar 510 with a rack gear 511 formed on one side, a driving motor 540 which is mounted on the support guide body 100 and has a rotating shaft, and a pinion gear 520 which is fixed to one end of the rotating shaft of the driving motor 540, and meshed with the rack gear 511 of the rack bar 510 to drive the rack bar 510. At this time the pinion gear 520 driven by the driving motor 540 may be configured so as to be direct-coupled with the rack gear 511, but it may as well be configured so as to be connected through a separate idle gear 530 as shown in FIG. 5. In addition, it is preferable that a submergible driving motor be used for the driving motor 540 as the installation place is underwater, and since a relatively large power is required, a hydraulic motor that operates by hydraulic pressure supplied from a separate hydraulic pressure unit (not shown) may be used. The configuration of the vertical driving unit 500 described here illustrative, and it can be changed in various configurations other than this. For example, configuration using a hydraulic cylinder (not shown) may be possible and a configuration of the lifting method using a separate crane (not shown) may also be possible.

According to such a configuration, if the pinion gear 520 is rotatably driven as the driving motor 540 operates, the guide bar 240 and the rack bar 510 coupled to the guide bar 240 are moved by the rack gear 511 meshed with the pinion gear 520 through the idle gear in the vertical direction along the guide slot 130. At this time, the support rod 230 and the generator body 220 also are moved in the vertical direction, as the guide bar 240 is moved up and down.

When the vertical position of the generation module 200 is adjusted based on the flow state of seawater through the vertical movement of the generation module 200, it is possible to improve further the electrical energy production efficiency of the tidal current power generator. That is, since the flow of seawater that occurs during flood tides or ebb tides could show different flow velocity distributions according to specific conditions such as weather, wind or flow frictional force, it is possible to produce more electrical energy by increasing the rotation velocity of the rotor blades 210, by moving the vertical position of the generation module 200 to a point where the flow velocity is the highest according to such vertical direction flow velocity distribution of seawater.

The inventive power generator further includes a plurality of flow velocity sensors 400 disposed in opposite end portions of the support guide body 100 at intervals in the vertical direction to detect a flow velocity of seawater as shown in FIGS. 4 and 6, and a controller 800 which controls the vertical driving unit 500 to control a vertical level of the generation module 200 based on the vertical distribution of flow velocity of seawater detected by the plurality of flow velocity sensors 400. It is possible that the operation of the vertical driving unit 500 is controlled by a separate controller.

That is, as shown in FIG. 6, if the flow velocity of seawater is faster in the upper layer portion, the generation module 200 is moved upward so that the rotor blades 210 of the generation module 200 are positioned in an upper level from the center of the support guide body 100 by the vertical driving unit 500 controlled by the controller, and if the flow velocity of seawater is faster in the lower layer portion, the generation module 200 can be configured in such a manner that the rotor blades 210 of the generation module 200 are positioned in a lower level from the center of the support guide body 100, and thereby the tidal current power generator according to one embodiment of the present invention can operate always in the optimized state to produce electrical energy at a higher efficiency.

Another advantage that can be obtained through such a vertical driving unit 500 is that it is possible to perform maintenance economically without extra equipment, as necessary work is done by lifting up the generation module 200 through the operational control of the vertical driving unit 500 at a point of time when maintenance of the generation module 200 is necessary.

Figure 7:
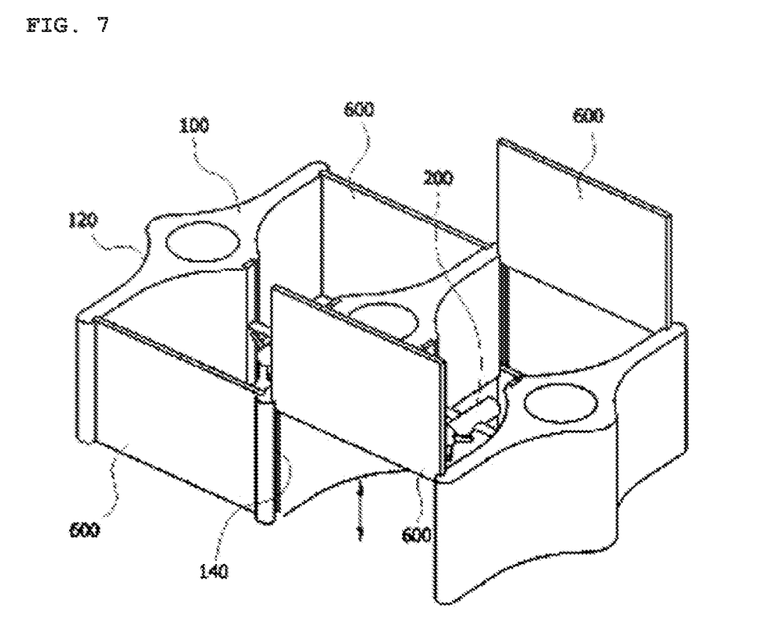
FIG. 7 is a perspective view schematically showing a configuration in which shield plates are inserted between the opposite support guide bodies of the tidal current power generator according to one embodiment of the present invention.

FIG. 7 is a perspective view schematically showing a configuration in which shield plates are inserted between the opposite support guide bodies of the tidal current power generator according to one embodiment of the present invention.

The tidal current power generator according to one embodiment of the present invention can have extra shield plates 600 on opposite end portions of the support guide body 100 in a lengthwise direction as shown in FIG. 7. At this time, the shield plates 600 have opposite ends coupled respectively to two support guide bodies 100 so as to be disposed in a space between the adjacent support guide bodies 100.

That is, as shown in FIG. 7, plate guide slots 140 may be formed in opposite end portions of the support guide body 100 in the vertical direction respectively, and opposite end portions of the shield plates 600 may be inserted into and coupled to two plate guide slots 140 formed to face each other in the opposite end portions of the adjacent support guides 100.

Such shield plates 600 are configured to decrease the flow of seawater flowing into the space between the adjacent support guide bodies 100 in a specific situation. In a normal state, the shield plates 600 are not inserted so that seawater can flow freely into the space between the adjacent support guide bodies 100; and in the case that the generation modules 200 are installed after only the support guide bodies 100 are installed or in the case that maintenance is necessary because an abnormal situation has occurred in the generation module 200, the inflow of seawater is shut off by insert-installing the shield plates 600 so as to prevent the inflow of seawater into the space between the adjacent support guide bodies 100.

Thus, it is possible to carry out necessary work anytime regardless of the intensity of seawater flow or maritime meteorological conditions, because the same working condition as on the ground is obtained by stopping the inflow of seawater since the shield plates 600 are installed in a specific situation as described above. Such a condition has an advantage that installation and maintenance costs can be drastically reduced since work is possible anytime, whereas installation and maintenance of a general tidal current power generation system can be performed only under a limited condition of a slack tide when the tide changes from an ebb tide to a flood tide or from a flood tide to an ebb tide.

Figure 8:
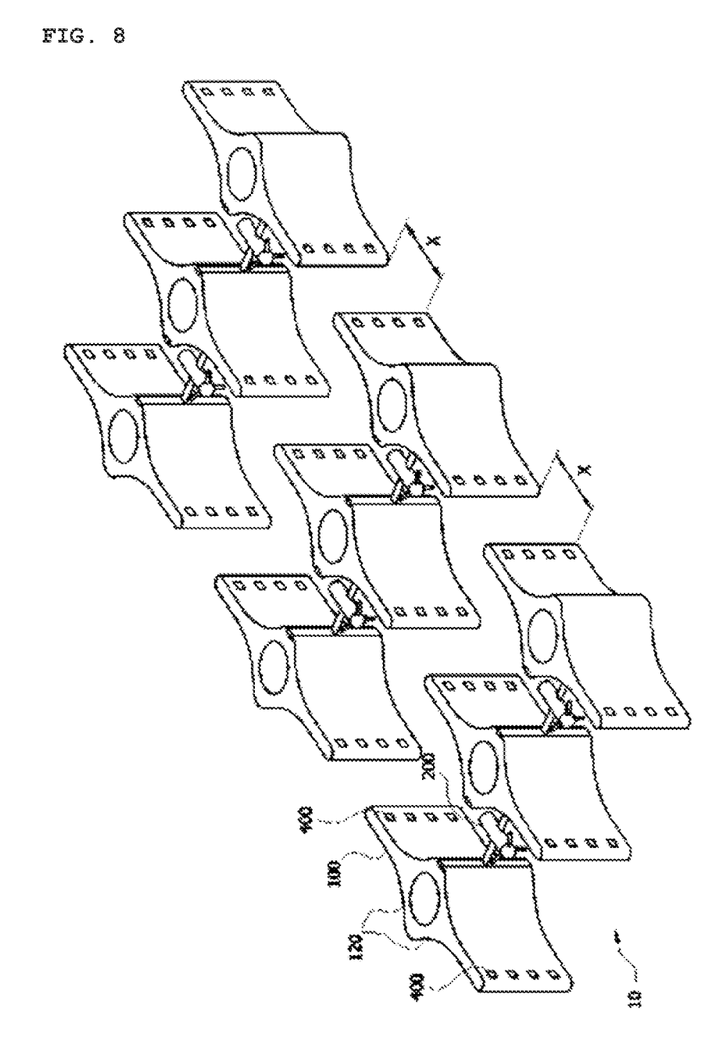
FIG. 8 is a perspective view schematically showing the installation structure of the tidal current power generator according to one embodiment of the present invention.

FIG. 8 is a perspective view schematically showing the installation structure of the tidal current power generator according to one embodiment of the present invention.

The tidal current power generator according to one embodiment of the present invention includes a plurality of support guide bodies 100 and the generation modules 200 disposed between the support guide bodies 100 as described above. In this case, n support guide bodies 100 and n−1 generation modules 200 disposed between the support guide bodies 100 form one generation assembly 10, which is assembled on the ground before it is installed integrally on the bottom of the sea.

That is, after all of the support guide bodies 100 and the generation modules 200 are assembled on the ground, one generation assembly 10 is configured so as to be installed integrally on the bottom of the sea. Therefore, most of the fabrication and assembly processes are performed on the ground without underwater work, so its installation work is very easy, and especially also during a large-scale maintenance work, maintenance work can be performed after one generation assembly 10 is lifted to dry land using a crane, etc., so that maintenance work can be performed easily as well.

Meanwhile, a plurality of generation assemblies 10 may be installed in the flow direction of seawater passing the support guide bodies 100 as shown in FIG. 8, that is, separated from each other at distance X intervals in the lengthwise direction of the support guide bodies 100.

In general, a plurality of generation modules 200 are installed in the forward/backward direction and the left/right direction of the generation modules 200, in building a tidal current power generation complex in an area where it is possible to produce electricity by tidal current. At this time, the interval between generation modules 200 should be separated far enough so that turbulent flow generated by the rotation of the rotor blades 210 of the generation module 200 does not affect the output of the adjacent generation module 200. However, the support guide body 100 of the tidal current power generator according to one embodiment of the present invention plays the role of causing the turbulent flow that has passed through the rotor blades 210 to revert to a normal state of laminar flow more rapidly.

Therefore, by building a tidal current power generation complex from the tidal current power generator according to one embodiment of the present invention, the interval between generation modules 200 can be decreased, so large-scale tidal current power generation becomes possible by installing more generation modules 200 in the same area.

Meanwhile, besides the method of being disposed in a row along the lengthwise direction of the support guide bodies 100 as described above, a plurality of generation assemblies 10 may be disposed along the mutual separation direction of the support guide bodies 100, that is, in the horizontal direction along the width direction of the support guide bodies 100.

In this case, the generation assembly 10 has flow velocity sensors 400 inserted between opposite end portions of the support guide body 100 in the lengthwise direction to detect the flow velocity of seawater, and the plurality generation assemblies 10 can be operated by the controller 800 so that only she generation assemblies 10 of the location, where the flow velocity of seawater relevant to the flow velocity section set beforehand along the flow velocity of seawater detected by the flow velocity sensor 400 appear, are selectively operated and produce electrical energy. Thus, operation can be controlled in a further optimized state, and unnecessary operation is removed, so that a state with higher energy efficiency can be maintained.

Although the present invention has been described in connection with the exemplary embodiments shown in the drawings, it is only illustrative. It will be understood by those skilled in the art that various modifications and equivalents can be made to the present invention. Therefore, the embodiments disclosed in the present invention are not to limit the technical ideas of the present invention but to describe them, and the scope of technical ideas of the present invention are not limited by such embodiments. The protection scope of the present invention should be interpreted by the claims below, and the technical ideas within the scope equivalent to it should be interpreted as included in the scope of rights of the present invention.

INDUSTRIAL APPLICABILITY

The tidal current power generator of the present invention has high-efficiency performance displayed through the improvement of electrical energy production and may be realized in various forms and can be used as environmentally friendly power generation equipment.

The invention claimed is:
1. A tidal current power generator for producing electrical energy by using a flow of seawater, comprising:
a plurality of support guide bodies disposed on a bottom of the sea at intervals in a width direction; and generation modules which are coupled to the support guide bodies so as to be positioned between the support guide bodies, and have rotor blades rotated by the flow of seawater to produce electrical energy by the rotary force of the rotor blades, wherein the support guide bodies are formed to guide the flow of seawater in a concentrated manner toward the generation module, a guide slot is formed in the central portion of the support guide body in a vertical direction, and opposite end portions of the generation module is slidably inserted in the guide slot in the vertical direction.

2. The tidal current power generator of claim 1, wherein the support guide bodies is formed in a longitudinally long shape disposed in a flow direction of seawater, and have sloping surfaces formed on both sides in such a way that a gap between mutually facing sides of the adjacent support guide bodies becomes gradually narrow toward the generation module in the flow direction of sea water.

3. The tidal current power generator of claim 2, wherein the sloping surfaces are formed in a curved surface.

4. The tidal current power generator of claim 2, wherein the sloping surfaces are formed from a central portion to opposite end portions of the support guide body in a lengthwise direction, and the generation module is disposed in the central portion of the support guide body in the lengthwise direction.

5. The tidal current power generator of claim 1, wherein the generation module comprising:

a generator body having a generator housed therein and the rotor blades coupled to one end portion thereof;

support rods extending from opposite sides of the generator body in a horizontal direction; and guide bars which are formed in an elongated shape in the vertical direction and connected to one end of the respective support rods to slidably inserted in the guide slot.

6. The tidal current power generator of claim 5, wherein the support rod is formed in a streamline shape with convexly curved portion in center to the lengthwise direction of a vertical section so as to decrease a resistance against the flow of seawater.

7. The tidal current power generator of claim 5, further comprising a vertical driving unit configured to move the generation module in the vertical direction along the guide slot.

8. The tidal current power generator of claim 7, wherein the vertical driving unit comprising:

a rack bar which is mounted on the guide bar and has a rack gear formed on one side thereof;

a driving motor mounted on the support guide body with a rotating shaft; and a pinion gear fixed to one end of the rotating shaft of the driving motor to mesh with the rack gear of the rack bar.

9. The tidal current power generator of claim 7, further comprising:

a plurality of flow velocity sensors disposed in opposite end portions of the support guide body at intervals in the vertical direction to detect a flow velocity of seawater; and a controller which controls the vertical driving unit to adjust a vertical level of the generation module based on the vertical distribution of flow velocity of seawater detected by the plurality of flow velocity sensors.

10. The tidal current power generator of claim 1, further comprising:

shield plates inserted between opposite end portions of the support guide body to be disposed between adjacent support guide bodies.

11. The tidal current power generator of claim 1, wherein n support guide bodies and n−1 generation modules disposed between n support guide bodies form one generation assembly, and the generation assembly is assembled on a ground before the generation assembly is installed integrally on the bottom of the sea.

12. The tidal current power generator of claim 1, wherein a plurality of generation assemblies are disposed in the lengthwise direction of the support guide body.

* * * * *